US009268330B2

(12) United States Patent
Brot et al.

(10) Patent No.: US 9,268,330 B2
(45) Date of Patent: Feb. 23, 2016

(54) METHOD FOR FUSING DATA FROM SENSORS USING A CONSISTENCY CRITERION

(71) Applicant: Airbus Operations (S.A.S.), Toulouse (FR)

(72) Inventors: Patrice Brot, Ramonille-Saint-Agne (FR); Emmanuel Fall, Toulouse (FR); Corinne Mailhes, Toulouse (FR); Jean-Yves Tourneret, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 14/553,125

(22) Filed: Nov. 25, 2014

(65) Prior Publication Data

US 2015/0148997 A1 May 28, 2015

(30) Foreign Application Priority Data

Nov. 28, 2013 (FR) ..................................... 13 61754

(51) Int. Cl.

| | |
|---|---|
| ***G05D 1/00*** | (2006.01) |
| ***G01D 3/08*** | (2006.01) |
| ***G01P 13/02*** | (2006.01) |
| ***G01P 21/02*** | (2006.01) |

(52) U.S. Cl.

CPC .. *G05D 1/00* (2013.01); *G01D 3/08* (2013.01); *G01P 13/025* (2013.01); *G01P 21/025* (2013.01)

(58) Field of Classification Search

USPC ............................................................ 701/3

See application file for complete search history.

(56) References Cited

U.S. PATENT DOCUMENTS

| | | | | |
|---|---|---|---|---|
| 5,963,662 | A | 10/1999 | Vachtsevanos et al. | |
| 7,099,796 | B2 * | 8/2006 | Hamza | 702/150 |
| 7,415,396 | B2 | 8/2008 | D'Ouince et al. | |
| 8,471,702 | B2 | 6/2013 | Babu et al. | |

(Continued)

FOREIGN PATENT DOCUMENTS

| | | |
|---|---|---|
| DE | 10 2011 056644 | 6/2012 |
| EP | 1 496 414 | 1/2005 |

OTHER PUBLICATIONS

S. Le Hégarat et al. "Application of Dempster-Shafer evidence theory to unsupervised classification in multisource remote sensing", IEEE Trans. on Geoscience and Remote Sensing, vol. 35, No. 4, Jul. 1997, pp. 1018-1031.

(Continued)

*Primary Examiner* — Thomas Tarcza
*Assistant Examiner* — Alex C Dunn
(74) *Attorney, Agent, or Firm* — Jenkins, Wilson, Taylor & Hunt, P.A.

(57) ABSTRACT

The disclosure relates to a data fusion method for fusing the measurements of a parameter, for example an aircraft flight parameter, that are taken by a plurality of sensors comprising a set of main sensors and sets of secondary sensors. The discrepancy between each main measurement and the secondary measurements is determined and a score of consistency with them is deduced therefrom. For each fault configuration of the main sensors, a first estimation, so-called conditional, of the parameter is performed and a weighting coefficient relating to this fault is calculated, taking account of the consistency scores of the main measurements. The parameter is thereafter estimated by performing a combination of the conditional measurements with the associated weighting coefficients.

17 Claims, 10 Drawing Sheets

(56) References Cited

U.S. PATENT DOCUMENTS

| | | | | |
|---|---|---|---|---|
| 8,682,507 | B2 * | 3/2014 | Ezerzere et al. | 701/7 |
| 8,970,401 | B2 * | 3/2015 | Molander et al. | 340/961 |
| 2002/0099481 | A1 * | 7/2002 | Mori | 701/23 |
| 2006/0025897 | A1 * | 2/2006 | Shostak et al. | 701/1 |
| 2006/0224321 | A1 * | 10/2006 | Lund et al. | 701/220 |
| 2006/0287840 | A1 * | 12/2006 | Henry et al. | 702/127 |
| 2008/0065281 | A1 * | 3/2008 | Tran | 701/3 |
| 2008/0294366 | A1 * | 11/2008 | Henry et al. | 702/127 |
| 2013/0253793 | A1 * | 9/2013 | Lee et al. | 701/70 |
| 2014/0022539 | A1 * | 1/2014 | France | 356/139.1 |
| 2014/0371990 | A1 * | 12/2014 | Steinhardt | 701/41 |

OTHER PUBLICATIONS

B. Schölkopf et al. "Estimating the support of a high dimensional distribution" Neural Computation, vol. 13, pp. 1443-1471, 2001.

French Search Report for Application No. 1361754 dated May 13, 2014.

* cited by examiner

METHOD FOR FUSING DATA FROM SENSORS USING A CONSISTENCY CRITERION

CROSS-REFERENCE TO RELATED APPLICATION

This application claims the benefit of and priority to French Patent Application No. 13 61754 filed Nov. 28, 2013, the entire disclosure of which is incorporated by reference herein.

TECHNICAL FIELD

The present disclosure relates to the field of the fusion of data from sensors, and more particularly so as to estimate an aircraft flight parameter.

BACKGROUND

An aircraft is equipped with a large number of sensors making it possible to measure its flight parameters (speed, attitude, position, altitude, etc.) and more generally its state at each instant.

These flight parameters are thereafter used by avionics systems, in particular the automatic piloting system, the flight computers (Flight Control Computer Systems), the aircraft control and guidance system (Flight Guidance System), which systems are among the most critical of the aircraft. Because of the criticality of these systems, the measured parameters must exhibit high integrity and high availability. Integrity is understood to mean that the parameter values used by the avionics systems are not erroneous because of any fault. Availability is understood to mean that the sensors providing these parameters must be sufficiently redundant for it to be possible for a measurement of each parameter to be permanently available. If a sensor develops a fault and cannot provide any measurements, another sensor takes over.

Generally, an avionics system receives measurements of one and the same parameter originating from several redundant sensors. When these measurements differ, the system performs a processing (data fusion) so as to estimate, by consolidation of the measurements, the parameter with the lowest risk of error. This processing is generally an average or a median of the measurements in question.

FIG. 1 illustrates a first exemplary processing of the measurements provided by redundant sensors.

Represented in this figure are the measurements of one and the same flight parameter, performed respectively by three sensors, $A_1$, $A_2$, $A_3$, as a function of time.

The processing consists here in calculating at each instant the median value of the measurements. Thus, in the example illustrated we select the measurement $a_2(t)$ of $A_2$ up to time $t_1$ and, beyond, the measurement $a_1(t)$ of $A_1$. Also represented in the chart is a tolerance band, of width $2\Delta$ around the median. If one of the measurements falls outside the tolerance band (for example the measurement $a_2(t)$ reckoning from the time $t_2$), it is considered that this measurement is erroneous and the latter is no longer taken into account in the estimation of the parameter in question. The corresponding sensor (here $A_2$) is disabled for the rest of the processing.

Generally, this processing can be applied provided that the number of redundant sensors is odd.

When the number of sensors is even, or else the number of sensors is odd but a sensor has already been disabled, the values of the measurements are simply averaged at each instant to obtain an estimation of the parameter in question.

All the sensors pertaining to one and the same technology may be affected by a common fault (for example presence of ice in the Pitot tubes, static pressure taps blocked, angle of incidence probes frozen, fault with one and the same electronic component, etc.). In this case, the aforementioned processing methods are not capable of identifying the erroneous sources. It is then advantageous to call upon additional sensors implementing a different technology or technologies. Hence, several sets of sensors are generally employed, making it possible to measure one and the same parameter, the technologies of the various sets of sensors being chosen dissimilar. By dissimilar technologies is meant that these technologies use different physical principles or different implementations.

For example, it is possible to resort to a first set of sensors capable of measuring the speed of the aircraft on the basis of pressure probes (total pressure and static pressure), also dubbed ADRs (Air Data Reference units), to a first estimator capable of estimating the speed as a function of the angle of incidence and of the lift (by the lift equation), and to a second estimator capable of estimating this speed on the basis of the engine data.

A first approach for estimating the parameter is to fuse all the measurements taken by the sensors, dissimilar or not, according to the same principle as previously. For example at a given instant, the median or the average of the values measured by the various sensors will be taken.

This first approach improves the robustness of the estimation of the parameter by liberating it of the faults that may affect a particular technology. On the other hand, it may lead to a noticeable reduction in the accuracy of the estimation as illustrated with the aid of the example hereinafter.

FIG. 2A represents the values of a flight parameter (here the speed of the aircraft) measured by a first set of three sensors (denoted $A_1,A_2,A_3$) using a first technology and by a second set of two sensors (denoted $B_1,B_2$) using a second technology dissimilar to the first. The measurements are denoted respectively $a_1(t),a_2(t),a_3(t)$ for the first set of sensors and $b_1(t),b_2(t)$ for the second set of sensors. It is assumed that the measurements $a_1(t)$, $a_2(t)$, $a_3(t)$ are substantially more accurate than the measurements $b_1(t),b_2(t)$. The real speed of the aircraft has been represented by $V(t)$.

It is assumed that at the time $t_f$ the sensors $A_1$ and $A_2$ of the first set are affected by one and the same fault. As may be seen in the figure, onwards of the time $t_f$, the measurements $a_1(t)$, $a_2(t)$ drift and deviate substantially from the real value of the parameter, $V(t)$.

FIG. 2B represents the estimation $\hat{V}(t)$ of the speed obtained as the median of the measurements $a_1(t)$, $a_2(t)$, $a_3(t)$, $b_1(t),b_2(t)$. It is seen that onwards of the time $t_c$, the calculation of the median amounts to selecting the measurement $b_2(t)$ of the sensor $B_2$. Now, this measurement is much less accurate than the measurement $a_3(t)$ of the sensor $A_3$ which is nevertheless available and valid.

It is seen that the data fusion applied to the whole set of measurements leads here to sub-optimal estimation accuracy.

The aim of the present disclosure is consequently to propose a data fusion method capable of fusing the measurements of a parameter, for example an aircraft flight parameter, that are taken by a plurality of sensors, of different technologies and accuracies, so as to obtain an estimation of this parameter which is not only available and robust but which also exhibits better accuracy than in the prior art.

SUMMARY

The present disclosure relates to a method for fusing measurements of a parameter, in particular of an aircraft flight parameter, on the basis of a first set of so-called main measurements taken by a first set of so-called main sensors and of a plurality of second sets of so-called secondary measurements taken by second sets of so-called secondary sensors, the main measurements exhibiting a greater degree of accuracy than the secondary measurements, in which:

- a discrepancy between each main measurement and the secondary measurements is calculated;
- a score of consistency of each main measurement with the secondary measurements is determined by the discrepancy thus obtained;
- for each possible fault configuration of the main sensors, a first estimation, so-called conditional, of the parameter is performed on the basis of the main measurements taken by the sensors which are not faulty in the configuration;
- for each fault configuration, a weighting coefficient is determined on the basis of the consistency scores of the main measurements obtained previously;
- an estimation of the parameter is performed by weighting the conditional estimations relating to the various fault configurations by the weighting coefficients corresponding to these configurations.

The main measurements which have the highest probability of being valid because of their consistency with the secondary measurements are thus favoured in the estimation of the parameter.

Preferably, for each set of secondary measurements, the calculation of the discrepancy between a main measurement and the secondary measurements comprises the calculation of the discrepancy between the main measurement and each secondary measurement of the set.

The score of consistency of a main measurement with the secondary measurements is advantageously obtained:

by calculating, on the basis of the discrepancy between the main measurement and each secondary measurement, masses respectively allocated to a first focal set corresponding to a first hypothesis of consistency of the main measurement with the secondary measurement, to a second focal set corresponding to a second hypothesis of absence of consistency of the main measurement with the secondary measurement and to a third hypothesis corresponding to an uncertainty of the consistency of the main measurement with the secondary measurement;

by estimating a belief that the main measurement is consistent with at least one of the secondary measurements on the basis of the masses thus obtained;

by estimating a plausibility that the main measurement is consistent with at least one of the secondary measurements on the basis of the masses thus obtained;

by calculating the consistency score by combining the belief and the plausibility by a combination function.

According to a variant, for each set of secondary measurements, the calculation of the discrepancy between a main measurement and the secondary measurements comprises the calculation of the discrepancy between the main measurement and a fused secondary measurement obtained by fusing the secondary measurements of the set.

The score of consistency of a main measurement with the secondary measurements is then advantageously obtained:

by calculating, on the basis of the discrepancy between the main measurement and each fused secondary measurement, masses respectively allocated to a first focal set corresponding to a first hypothesis of consistency of the main measurement with the fused secondary measurement, to a second focal set corresponding to a second hypothesis of absence of consistency of the main measurement with the fused secondary measurement and to a third hypothesis corresponding to an uncertainty of the consistency of the main measurement with the fused secondary measurement;

by estimating a belief that the main measurement is consistent with at least one of the fused secondary measurements on the basis of the masses thus obtained;

by estimating a plausibility that the main measurement is consistent with at least one of the fused secondary measurements on the basis of the masses thus obtained;

by calculating the consistency score by combining the belief and the plausibility by a combination function. The combination function can in particular be an average.

The score of consistency of a main measurement with the secondary measurements is obtained:

by calculating fuzzy values of strong consistency, average consistency, weak consistency between the main measurement and each secondary measurement on the basis of the discrepancy between the main measurement and this secondary measurement;

by calculating fuzzy consistency rules operating on the fuzzy values;

by calculating the consistency score by combining the fuzzy rules thus calculated.

Alternatively, the score of consistency of a main measurement with the secondary measurements is obtained:

by calculating fuzzy values of strong consistency, average consistency, weak consistency between the main measurement and each fused secondary measurement on the basis of the discrepancy between the main measurement and this fused secondary measurement;

by calculating fuzzy consistency rules operating on the fuzzy values;

by calculating the consistency score by combining the fuzzy rules thus calculated with the aid of a combination operator.

The fuzzy consistency rules advantageously use Lukasiewicz OR, AND and NOT fuzzy operators.

The combination operator is for example an OR function.

The fuzzy rules can be weighted with weighting factors before the combination, a weighting factor of a rule being all the higher the more the latter involves a fuzzy value of strong consistency with a larger number of elementary measurements.

According to a variant, the score of consistency of a main measurement with the secondary measurements can be obtained by a supervised learning method of "one class SVM" type.

In a similar manner, the score of consistency of a main measurement with the fused secondary measurements can be obtained by a supervised learning method of "one class SVM" type.

According to a first advantageous exemplary embodiment, the conditional estimation, relating to a fault configuration of the main sensors, is obtained as the median of the main measurements of the functioning sensors of this configuration, when the number of the functioning sensors is odd.

According to a second advantageous exemplary embodiment, the conditional estimation, relating to a fault configuration of the main sensors, is obtained as the average of the main measurements of the functioning sensors of this configuration.

BRIEF DESCRIPTION OF THE DRAWINGS

Other characteristics and advantages of the disclosure will become apparent on reading preferential embodiments of the disclosure, with reference to the attached figures among which.

DETAILED DESCRIPTION

This disclosure hereinafter describes the estimation of a parameter, by a plurality of measurements of this parameter, obtained by various sensors.

The present disclosure applies more particularly to the estimation of an aircraft flight parameter, for example of its speed, of its attitude or else of its position. It is however not limited to such an application but may on the contrary apply to numerous technical fields in which it is necessary to fuse measurements of a plurality of sensors.

By sensor is meant here a physical sensor capable of directly measuring the parameter in question but also a system that may comprise one or more physical sensor(s) as well as signal processing and structure making it possible to provide an estimation of the parameter on the basis of the measurements provided by these physical sensors. In a similar manner, the term measurement of this parameter will designate equally well a raw measurement of a physical sensor and a measurement obtained by a more or less complex signal processing on the basis of raw measurements.

It is assumed that a first set of so-called main sensors is available, capable of each providing a measurement of the parameter with a first degree of accuracy. The main sensors use a first technology within the sense defined above, that is to say use a first physical principle or a first particular implementation.

It is also assumed that a plurality of sets of so-called secondary sensors is available. These secondary sensors are capable of each providing a measurement, a so-called secondary measurement, of the parameter in question but with a second degree of accuracy lower than the first degree of accuracy. The degree of accuracy of the secondary measurements can vary between from one second set to another but it is in any event lower than the degree of accuracy of the main measurements.

Each set of secondary sensors is based on a second technology dissimilar to the first technology. This second technology consequently uses a different physical principle or a different implementation from that used by the first technology, so that the probabilities of a fault with a main sensor and with a secondary sensor are independent. The technologies used by the various sets of secondary sensors are also mutually dissimilar.

Figure 3:
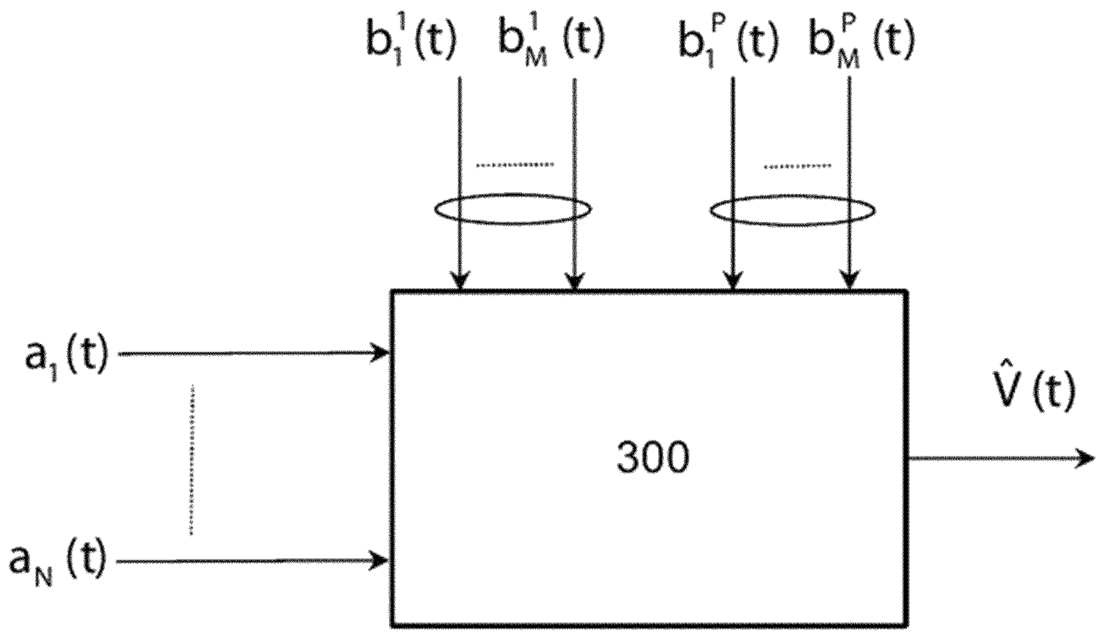
FIG. 3 represents in a schematic manner the context of application of the present disclosure.

Represented in FIG. 3 is the context of application of the disclosure with the notation which will be used subsequently.

The parameter to be estimated is denoted V (for example the speed of the aircraft). The measurements provided by the main sensors, $A_1, \ldots, A_N$, are denoted $a_1(t), \ldots, a_N(t)$. It is assumed that P sets of secondary sensors ($P \geq 2$) are available. For each set $p=1, \ldots, P$, $B_1^p, \ldots B_M^p$ denotes the sensors and $b_1^p(t), \ldots, b_M^p(t)$ denotes the measurements provided by these sensors (it has been assumed without loss of generality that each set of secondary sensors comprised an identical number of sensors).

The data fusion module, 300, receives, on the one hand, the set of main measurements $a_1(t), \ldots, a_N(t)$ and, on the other hand, the sets of secondary measurements, $b_1^p(t), \ldots, b_M^p(t)$, $p=1, \ldots, P$.

On the basis of the main and secondary measurements, the data fusion module provides an estimation of the parameter, denoted $\hat{V}(t)$.

Figure 4:
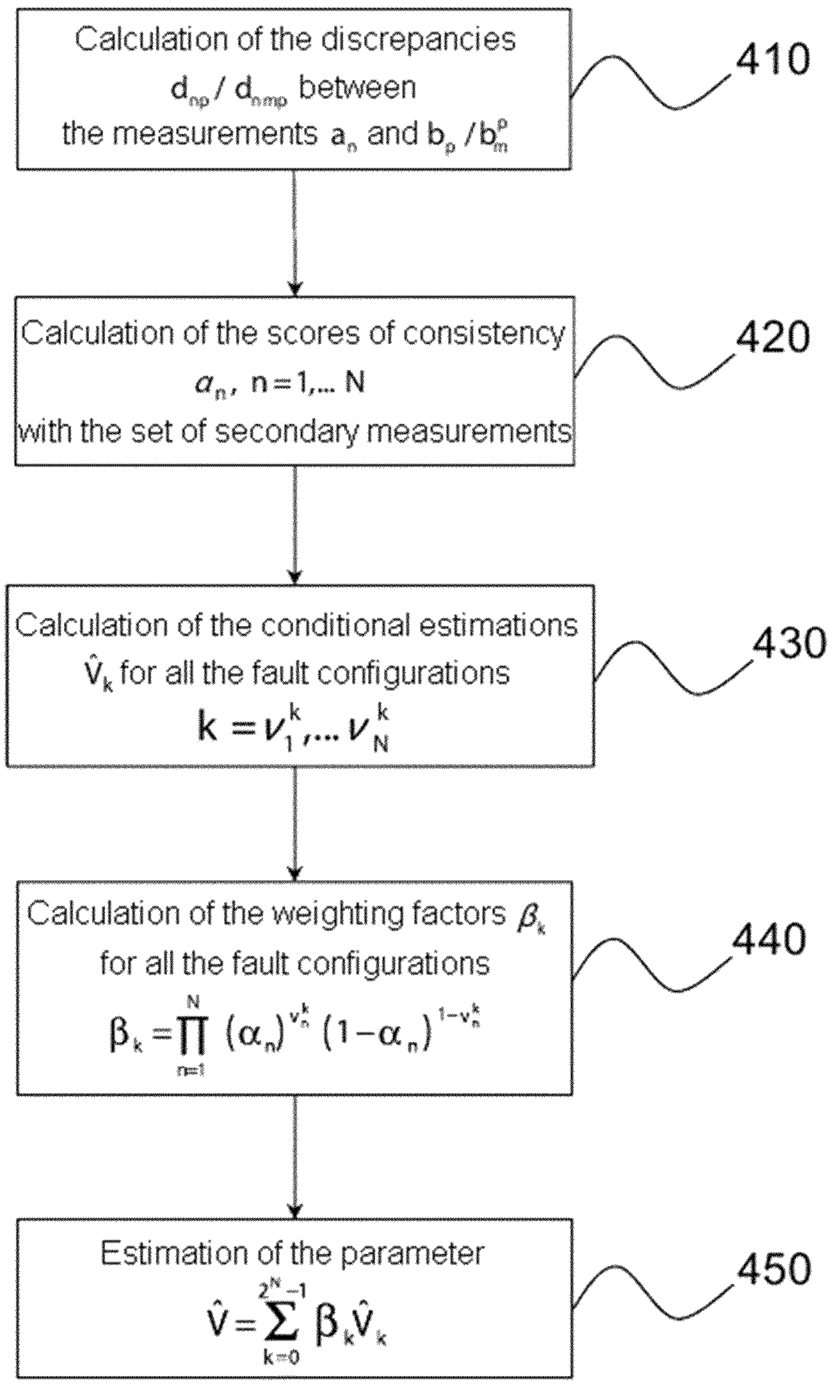
FIG. 4 represents in a schematic manner a flowchart of a data fusion method according to an embodiment of the disclosure.

An embodiment of the data fusion method implemented in the module 300 has been represented in FIG. 4.

In a first step, 410, a discrepancy $d_{nmp}$ between each main measurement $a_n(t)$, $n=1, \ldots, N$ and each secondary measurement $b_m^p(t)$, $m=1, \ldots, M$, $p=1, \ldots, P$ is calculated. This discrepancy can be expressed as a modulus $|a_n(t)-b_m^p(t)|$, a quadratic difference $(a_n(t)-b_m^p(t))^2$, a logarithmic ratio $$\left|\log\frac{a_n(t)}{b_m^p(t)}\right|,$$

etc.

In a second step, 420, a score of consistency, $\alpha_n$, of this main measurement with the set of secondary measurements, $b_m^p(t)$ is calculated, for each main measurement, $a_n(t)$, on the basis of the discrepancies $d_{nmp}$ obtained previously. This consistency score expresses the measure to which the main measurement is consistent with the set of secondary measurements. It will be assumed hereinafter, without loss of generality, that the consistency scores lie between 0 and 1.

Alternatively, steps 410 and 420 can be simplified by undertaking the prior fusion of the measurements of each set of secondary sensors. Stated otherwise, the secondary measurements $b_m^p(t)$, $m=1, \ldots, M$, are fused, by calculating for example their average or their median. The measurement thus fused is denoted $b_p(t)$. In this case, it will be understood that step 410 consists in calculating the discrepancies between each main measurement $a_n(t)$, $n=1, \ldots, N$ and each fused secondary measurement $b_p(t)$, $p=1, \ldots, P$ and that step 420 consists in calculating, for each main measurement, $a_n(t)$, the score of consistency, $\alpha_n$, of this main measurement with the set of fused secondary measurements, $b_p(t)$, $p=1, \ldots, P$.

In all cases, a first estimation of the parameter, V, the so-called conditional estimation, denoted $\hat{V}_k$, is performed in step 430, for each possible fault configuration k of the main sensors, $A_n$, $n=1, \ldots, N$. An N-tuple of binary values $\nu_1^k, \ldots, \nu_N^k$, each binary value $\nu_n^k$ indicating whether the sensor $A_n$ is or is not faulty, is called a fault configuration. Without loss of generality, we will assume that the value 0 signifies a fault with the sensor and the value 1, an absence of fault. The fault configuration index k is the binary word $\nu_1^k, \ldots, \nu_N^k$. It is therefore understood that $0 \le k \le 2^N-1$ and that the number of possible fault configurations is $2^N$. For a given fault configuration $k=\nu_1^k, \ldots, \nu_N^k$, the conditional estimation $\hat{V}_k$ involves only the main measurements of the sensors which are not faulty in this configuration, stated otherwise the main measurements $a_n(t)$, such that $\nu_n^k=1$, with the exclusion of the other main measurements.

Advantageously, when the number of sensors which are not faulty in the configuration k, that is to say $$n_{coh}^k = \sum_{n=1}^{N} \nu_n^k$$

(where the sum is calculated here in) is odd, the conditional estimation is obtained as the median of the main measurements of the functioning sensors, i.e.:

$$\hat{V}_k = \text{median}\{a_n(t) | \nu_n^k=1, n=1, \ldots, N\} \tag{1}$$

On the other hand, when the number of functioning main sensors of the configuration k, $n_{coh}^k$, is even, the conditional estimation is obtained as the average of the main measurements of these sensors, i.e.:

$$\hat{V}_k = \text{mean}\{a_n(t) | \nu_n^k=1, n=1, \ldots, N\} \tag{2}$$

Alternatively to the calculation of the average, it is possible to obtain a first median value over the $n_{coh}^k-1$ (odd number) lowest main measurements of the functioning sensors and a second median value over the $n_{coh}^k-1$ highest main measurements, the estimation $\hat{V}_k$ then being calculated as the average between the first and second median values.

It will be noted furthermore that the conditional estimation may also be obtained as the average of the main measurements in the case where the number $n_{coh}^k$ of functioning main sensors of the configuration k is odd.

Whatever the parity of k, it will be possible, if appropriate, to take one or more secondary measurements, fused or not, into account in the conditional estimation $\hat{V}_k$. In this case, the conditional estimation $\hat{V}_k$ may be obtained by a combination of the main measurements of the functioning sensors of the configuration k and of the secondary measurements, weighted by their respective degrees of accuracy. Thus, if $\hat{V}_k^h$ denotes the conditional estimation of the parameter V, based solely on the main measurements of the configuration k, and $\hat{V}_p^l$ denotes the estimation of this same parameter with the aid of the secondary measurements $b_m^p(t)$, m=1, . . . , M, the conditional estimation $\hat{V}_k$ may have the following form:

$$\hat{V}_k = \frac{\eta^h \hat{V}_k^h + \sum_{p=1}^{P} \eta_p^l \hat{V}_p^l}{\eta^h + \sum_{p=1}^{P} \eta_p^l} \tag{2'}$$

where $\eta^h$ is the degree of accuracy of the main measurements $a_n(t)$, n=1, . . . , N (which is assumed identical whatever the main measurement) and $\eta_p^l$ is the degree of accuracy of the secondary measurements $b_m^p(t)$, m=1, . . . , M, the degrees of accuracy being all the higher the more accurate the measurements ($\eta^h > \eta_p^l$, p=1, . . . , P).

Finally, in the particular case where k=0, stated otherwise when all the main sensors are considered to be faulty, the conditional estimation $\hat{V}_k$ can be obtained on the basis of the secondary measurements, $b_m^p(t)$, for example as the median value or the average value of these measurements.

In step 440, weighting factors are calculated for the various possible fault configurations of the main sensors on the basis of the scores, obtained in step 420, of consistency of the main measurements with the secondary measurements. The weighting factor relating to a fault configuration of the main sensors conveys the probability of this configuration, having regard to the consistency observed between each of the main measurements and the set of secondary measurements.

For a given configuration $k=\nu_1^k, \ldots, \nu_N^k$, the weighting factor $\beta_k$ for this configuration is calculated by:

$$\beta_k = \prod_{n=1}^{N} (\alpha_n)^{\nu_n^k} (1-\alpha_n)^{1-\nu_n^k} \tag{3}$$

It is understood from expression (3) that the weighting factor for the fault configuration k is the product of the consistency scores relating to the functioning sensors in this configuration and of the non-consistency scores for the faulty sensors. Stated otherwise, the probabilities of the various fault configurations are deduced from the scores of consistency of each main measurement with the set of secondary measurements.

Finally, in step 450, the estimation of the parameter is calculated by weighting the conditional estimations $\hat{V}_k$, relating to the various fault configurations, k=0, . . . , $2^N-1$ by their respective weighting coefficients, i.e.:

$$\hat{V} = \sum_{k=0}^{2^N-1} \beta_k \hat{V}_k \tag{4}$$

The calculation of the scores of consistency between each main measurement $a_n(t)$ and the set of secondary measurements $b_m^p(t)$, p=1, . . . , P, m=1, . . . , M (or else in case of prior fusion between each main measurement $a_n(t)$ and the set of secondary measurements $b_p(t)$, p=1, . . . , P) can be carried out according to several variants.

With the aim of simplifying the presentation, we will assume that P=2 sets of secondary sensors are available and that a prior fusion of the measurements has been performed for each of these two sets. Neither will we mention in the notation for the main/secondary measurements the time variable t, the latter henceforth being considered to be implied.

Thus, $a_n$ will denote the measurements of the main sensors, $b_1$ will denote the (fused) measurement of the first set of secondary sensors, and $b_2$ will denote the (fused) measurement of the second set of secondary sensors.

According to a first variant, the consistency scores are obtained through the Dempster-Shafer evidence method. An account of this method will be found in particular in the article by S. Le Hégarat et al. entitled "Application of Dempster-Shafer evidence theory to unsupervised classification in multisource remote sensing", published in IEEE Trans. on Geoscience and Remote Sensing, Vol. 35, No. 4, July 1997, pp. 1018-1031.

The Dempster-Shafer method assumes that on the one hand a set 0 of hypotheses is defined, called the discernment framework, and that on the other hand a plurality of information sources is available affording evidence for this or that hypothesis.

For each main measurement $a_n$, the following hypotheses can be considered, represented by subsets of $\Theta$:

$a_nb_1$: the measurement $a_n$ is consistent with the secondary measurement $b_1$;

$\overline{a_nb_1}$: the measurement $a_n$ is not consistent with the secondary measurement $b_1$;

$X_{a_nb_1}$: the consistency between the measurements $a_n$ and $b_1$ is uncertain;

$a_nb_2$: the measurement $a_n$ is consistent with the secondary measurement $b_2$;

$\overline{a_nb_2}$: the measurement $a_n$ is not consistent with the secondary measurement $b_2$;

$X_{a_nb_2}$: the consistency between the measurements $a_n$ and $b_2$ is uncertain.

The descriptors liable to afford information on these hypotheses are the discrepancies, such as calculated in step 410 of FIG. 4, between the main measurements and the secondary measurements, and more precisely:

- the discrepancy $d_{n1}$ between the measurements $a_n$ and $b_1$ for the hypotheses $a_nb_1$, $\overline{a_nb_1}$, $X_{a_nb_1}$;
- the discrepancy $d_{n2}$ between the measurements $a_n$ and $b_2$ for the hypotheses $a_nb_2$, $\overline{a_nb_2}$, $X_{a_nb_2}$.

In the terminology used in the Dempster-Shafer theory, the subsets of 0 for which the descriptors can afford evidence (or belief) are dubbed focal sets.

Thus, the subsets $a_nb_1$, $\overline{a_nb_1}$, $X_{a_nb_1}$ are the focal sets associated with the descriptor $d_{n1}$ and the subsets $a_nb_2$, $\overline{a_nb_2}$, $X_{a_nb_2}$ are the focal sets associated with the descriptor $d_{n2}$.

All the possible intersections/unions of the focal sets and their intersections/unions form the discernment framework $\Theta$. Stated otherwise $\Theta$ contains the focal sets and is stable under the operations of intersection and union.

The quantity of evidence that a descriptor allocates to an associated focal set is dubbed mass.

Figure 5:
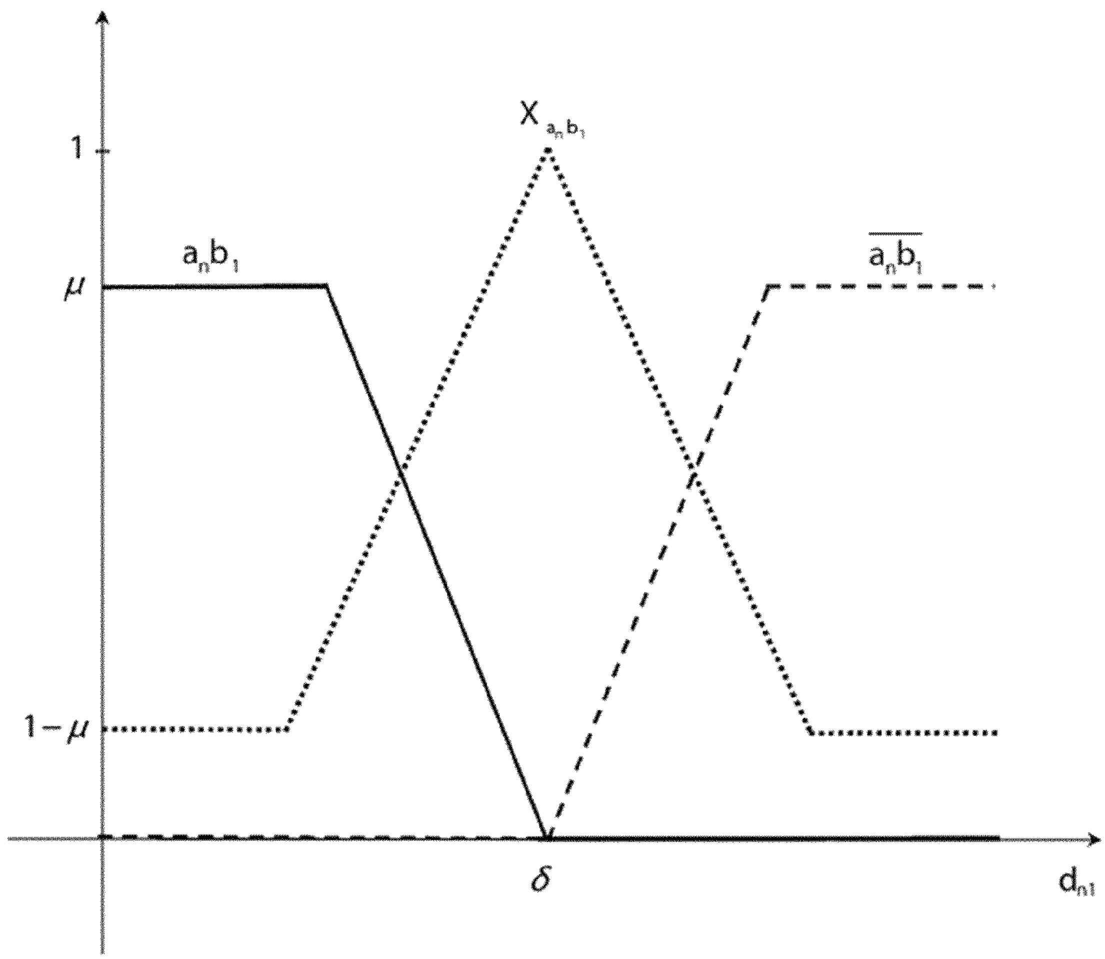
FIG. 5 represents masses of Dempster-Shafer focal sets as a function of the discrepancy between a main measurement and a secondary measurement.

FIG. 5 represents an exemplary allocation of masses to the focal sets $a_nb_1$, $\overline{a_nb_1}$, $X_{a_nb_1}$ by the descriptor $d_{n1}$.

The values of the masses lie between 0 and 1. It is noted that the mass $m(a_nb_1)$ allocated to the focal set $a_nb_1$ is a decreasing function of the discrepancy $d_{n1}$ and attains the value zero for a threshold value $\delta$. The mass allocated to the focal set $\overline{a_nb_1}$ is on the other hand an increasing function of the discrepancy $d_{n1}$, onwards of the zero value when the discrepancy is equal to the threshold $\delta$. Finally the mass allocated to the uncertainty $X_{a_nb_1}$ is maximal ($m(X_{a_nb_1})=1$) when the masses allocated to the focal sets $a_nb_1$ and $\overline{a_nb_1}$ are minimal (stated otherwise for $d_{b1}=\delta$) and the latter is minimal ($m(X_{a_nb_1})=1-\mu$) when one of the masses allocated to the focal sets $a_nb_1$ and $\overline{a_nb_1}$ is maximal ($m(a_nb_1)=\mu$ or $m(\overline{a_nb_1})=\mu$). In all cases, the sum of the masses allocated to the focal sets by the descriptor is equal to 1:

$$m(a_nb_1)+m(\overline{a_nb_1})+m(X_{a_nb_1})=1 \tag{5-1}$$

In the same manner we have:

$$m(a_nb_2)+m(\overline{a_nb_2})+m(X_{a_nb_2})=1 \tag{5-2}$$

The intersections between the focal sets are subsets of $\Theta$ (and therefore of the elements of the set $\wp(\Theta)$ of the parts of $\Theta$). For a given main measurement $a_n$, the intersections can be represented by the following table:

TABLE I

| | $a_nb_1$ | $\overline{a_nb_1}$ | $X_{a_nb_1}$ |
|---|---|---|---|
| $a_nb_2$ | $a_nb_1\cap a_nb_2$ | $\overline{a_nb_1}\cap a_nb_2$ | $X_{a_nb_1}\cap a_nb_2$ |
| $\overline{a_nb_2}$ | $a_nb_1\cap\overline{a_nb_2}$ | $\overline{a_nb_1}\cap\overline{a_nb_2}$ | $X_{a_nb_1}\cap\overline{a_nb_2}$ |
| $X_{a_nb_2}$ | $a_nb_1\cap X_{a_nb_2}$ | $\overline{a_nb_1}\cap X_{a_nb_2}$ | $X_{a_nb_1}\cap X_{a_nb_2}$ |

The following hypothesis $H_n$, an element of $\Theta$, is now considered:

$H_n$: the main measurement $a_n$ is consistent with at least one of the secondary measurements $b_1$ and $b_2$.

This hypothesis can be represented by the union of the subsets appearing in the first column and the first row of table I, stated otherwise those which appear in the following table:

TABLE II

| | $a_nb_1$ | $\overline{a_nb_1}$ | $X_{a_nb_1}$ |
|---|---|---|---|
| $a_nb_2$ | $a_nb_1\cap a_nb_2$ | $\overline{a_nb_1}\cap a_nb_2$ | $X_{a_nb_1}\cap a_nb_2$ |
| $\overline{a_nb_2}$ | $a_nb_1\cap\overline{a_nb_2}$ | | |
| $X_{a_nb_2}$ | $a_nb_1\cap X_{a_nb_2}$ | | |

Indeed, the first column of the table corresponds to the consistency of the main measurement $a_n$ with the secondary measurement $b_1$ and the first row of the table corresponds to the consistency of the main measurement $a_n$ with the secondary measurement $b_2$.

The belief of the hypothesis $H_n$ is defined as the sum of the beliefs of the sets included in $H_n$, stated otherwise:

$$Bel(H_n)=\sum_{\substack{\Omega\in\mathcal{P}(\Theta)\\ \Omega\subseteq H_n}} m(\Omega) \tag{6}$$

In the present case, the belief of the hypothesis $H_n$ can be expressed in the following manner:

$$\mathrm{Bel}(H_n)=m(a_nb_1\cap a_nb_2)+m(\overline{a_nb_1}\cap a_nb_2)+m(X_{a_nb_1}\cap a_nb_2)+m(a_nb_1\cap\overline{a_nb_2})+m(a_nb_1\cap X_{a_nb_2}) \tag{7}$$

and, by assuming an absence of conflict between the secondary measurements:

$$\mathrm{Bel}(H_n)=m(a_nb_1)\cdot m(a_nb_2)+m(\overline{a_nb_1})\cdot m(a_nb_2)+m(X_{a_nb_1})\cdot m(a_nb_2)+m(a_nb_1)\cdot m(\overline{a_nb_2})+m(a_nb_1)m(X_{a_nb_2}) \tag{8}$$

The Dempster-Shafer method makes it possible to also define the plausibility of the hypothesis $H_n$ as the sum of the beliefs of the sets having a non-empty intersection with $H_n$, stated otherwise:

$$Pls(H_n)=\sum_{\substack{\Omega\in\mathcal{P}(\Theta)\\ \Omega\cap H_n\neq\phi}} m(\Omega) \tag{9}$$

If table I is considered again, it is understood that the sum of expression (9) involves all the elements of the table except for the central element; this can be represented by:

TABLE III

| | $a_nb_1$ | $\overline{a_nb_1}$ | $X_{a_nb_1}$ |
|---|---|---|---|
| $a_nb_2$ | $a_nb_1\cap a_nb_2$ | $\overline{a_nb_1}\cap a_nb_2$ | $X_{a_nb_1}\cap a_nb_2$ |
| $\overline{a_nb_2}$ | $a_nb_1\cap\overline{a_nb_2}$ | | $X_{a_nb_1}\cap\overline{a_nb_2}$ |
| $X_{a_nb_2}$ | $a_nb_1\cap X_{a_nb_2}$ | $\overline{a_nb_1}\cap X_{a_nb_2}$ | $X_{a_nb_1}\cap X_{a_nb_2}$ |

The plausibility of $H_n$ can be expressed simply on the basis of the belief of $H_n$, by taking into account the further elements appearing in table III:

$$\mathrm{Pls}(H_n)=Bl(H_n)+m(\overline{a_nb_1})\cdot m(X_{a_nb_2})+m(X_{a_nb_1})\cdot m(\overline{a_nb_2})+m(X_{a_nb_1})\cdot m(X_{a_nb_2}) \tag{10}$$

The belief and the plausibility bracket the probability that the hypothesis $H_n$ is properly satisfied. The consistency score of the main measurement $a_n$ is then defined by combining the belief and the plausibility of $H_n$ with the aid of a combination function. It is for example possible to define the consistency score of the main measurement $a_n$ by the arithmetic mean:

$$\alpha_n = \tfrac{1}{2}(\mathrm{Bel}(H_n)+\mathrm{Pls}(H_n)) \qquad (11)$$

Other combination functions (for example geometric mean) of the belief and of the plausibility may be envisaged by the person skilled in the art without departing from the scope of the present disclosure.

Figure 6:
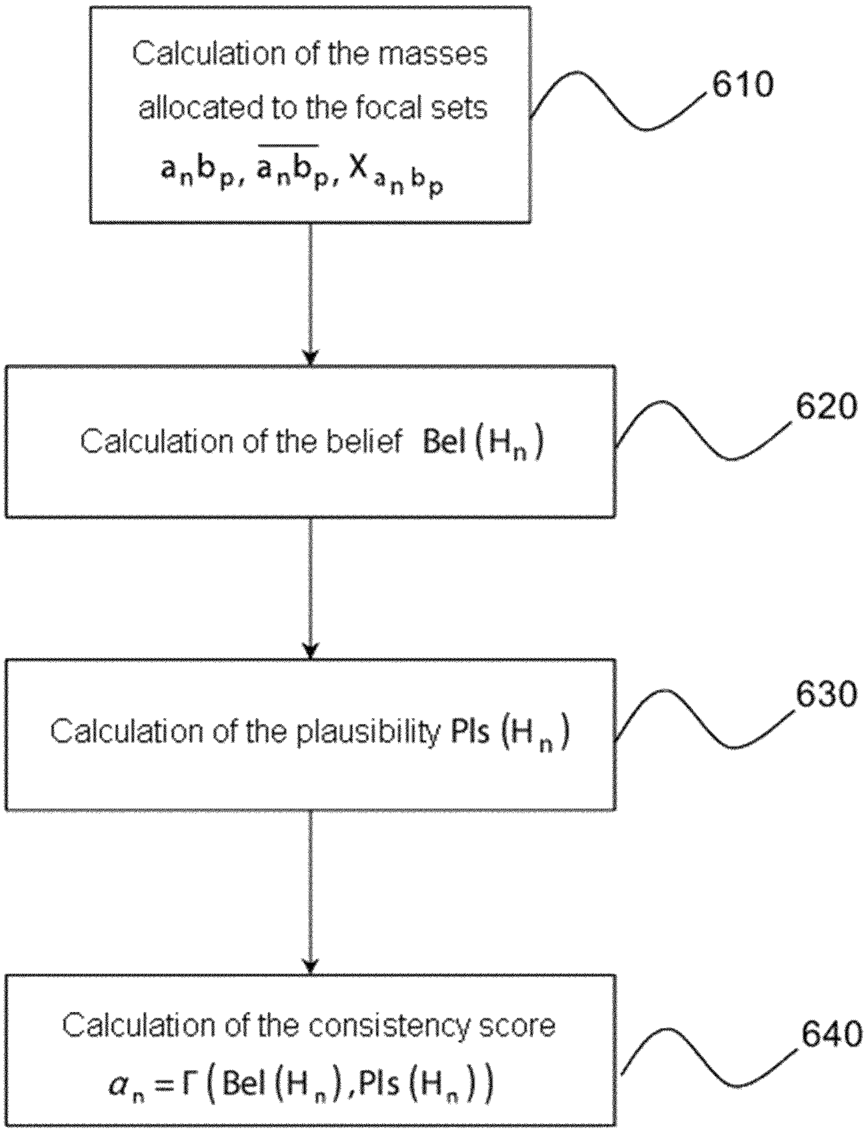
FIG. 6 represents a first variant for calculating a score of consistency of a main measurement with the set of secondary measurements.

Returning to the general case of an arbitrary number $P\geq 2$ of set of secondary sensors, FIG. 6 represents in a schematic manner the calculation of the score of consistency of a main measurement $a_n$ with the set of secondary measurements $b_p$, $p=1, \ldots, P$.

In step 610 are calculated the masses allocated to the focal sets $a_n b_p$, $\overline{a_n b_p}$, $X_{a_n b_p}$, $p=1, \ldots, P$, by the descriptor $d_{np}$ conveying the discrepancy between the measurements $a_n$ and $b_p$. The mass functions are for example determined beforehand in a heuristic manner.

In step 620, the belief $\mathrm{Bel}(H_p)$ of the hypothesis $H_n$ of consistency of the measurement $a_n$ with at least one of the secondary measurements $b_p$, $p=1, \ldots, P$, is calculated on the basis of the masses calculated in the previous step.

In step 630, the plausibility $\mathrm{Pls}(H_n)$ of the hypothesis $H_n$ of consistency of the measurement $a_n$ with at least one of the secondary measurements $b_p$, $p=1, \ldots, P$, is calculated on the basis of the belief $\mathrm{Bel}(H_n)$ calculated in the previous step and of the masses calculated in step 620.

In step 640, the score of consistency $\alpha_n$ of the main measurement $a_n$ with the set of secondary measurements is calculated by combining the belief $\mathrm{Bel}(H_n)$ and the plausibility $\mathrm{Pls}(H_n)$, $\alpha_n=\Gamma(\mathrm{Bel}(H_n),\mathrm{Pls}(H_n))$ where $\Gamma$ is a combination function, for example an average.

In the case where there is no prior fusion of the measurements in steps 410, 420, then MP secondary measurements $b_m^P$, $p=1, \ldots, P$, $m=1, \ldots, M$ are available. It is possible to calculate the masses allocated to the three focal sets $a_n b_m^P$, $\overline{a_n b_m^P}$, $X_{a_n b_m^P}$ for each of these MP measurements. The calculation of the consistency score then continues in a similar manner, the consistency hypothesis $H_n$ being replaced with a slacker hypothesis, $\tilde{H}_n$, according to which the measurement $a_n$ is consistent with at least one of the secondary measurements $b_m^P$, $p=1, \ldots, P$, $m=1, \ldots, M$.

According to a second variant, the consistency scores are obtained by a fuzzy logic method.

Accordingly, a plurality of linguistic variables $L_{np}$ (within the fuzzy logic sense) is defined as the consistency of the measurement $a_n$ with the secondary measurement $b_p$ (fusion of the secondary measurements $b_m^P$, $m=1, \ldots, M$). The linguistic variable $L_{np}$ can be expressed in the form of three linguistic terms {strong consistency, average consistency; weak consistency}, each of these terms being semantically defined as a fuzzy set over the values of discrepancy $d_{np}$ between the measurements $a_n$ and $b_p$.

Figure 7:
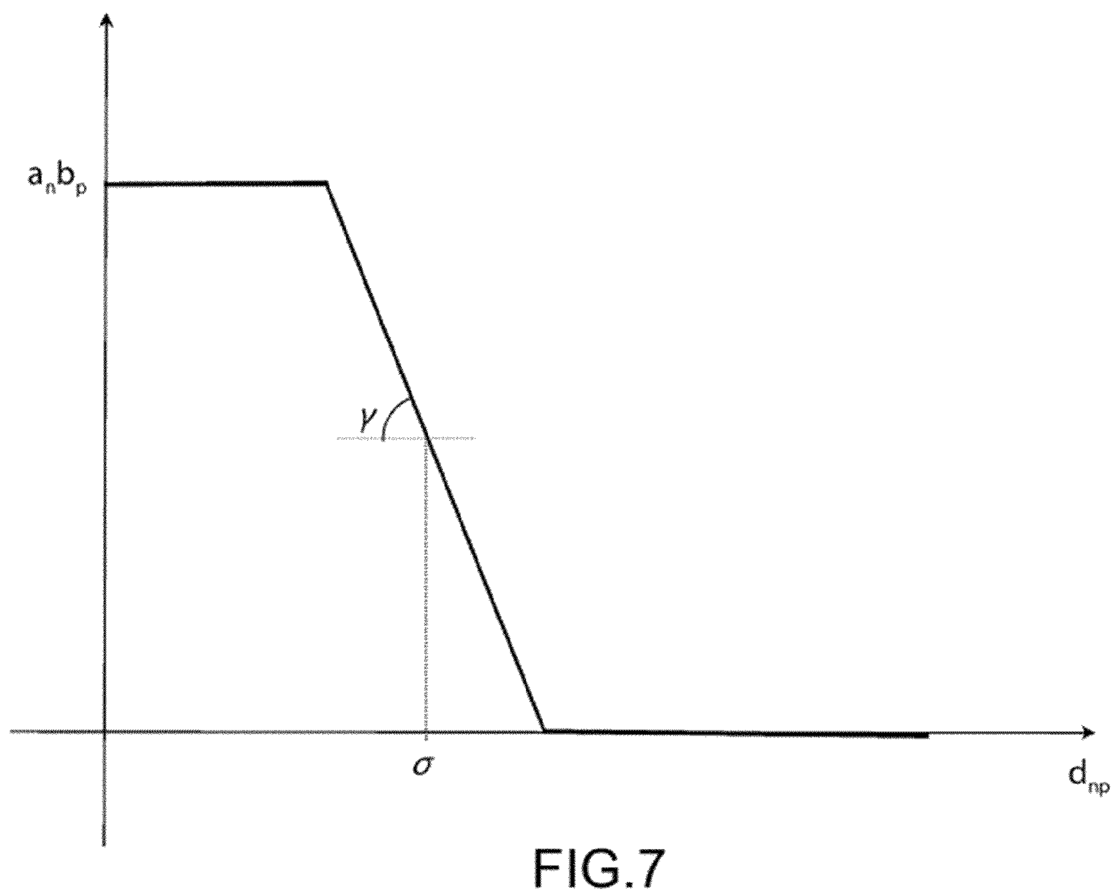
FIG. 7 represents a membership function for a linguistic term relating to a strong consistency between a main measurement and a secondary measurement.

FIG. 7 represents an exemplary membership function defining the linguistic term "strong consistency" for the linguistic variable $L_{np}$. The discrepancy $d_{np}$ between the measurements $a_n$ and $b_p$ has been indicated as abscissa. This membership function can be parameterized by a value of transition threshold $\sigma$ and a slope $\gamma$ of the straight segment joining the values 0 and 1. The membership function can follow a more complex law, for example a nonlinear law (for example an arctan law) or else a law with linear parts linked together by polynomial functions (for example splines).

The parameters of these membership functions can be obtained in a heuristic manner or by learning. In the same manner, membership functions give the definition of the terms "average consistency" and "weak consistency".

Returning to the above case of two (fused) secondary measurements $b_1, b_2$ the calculation of the consistency score can call upon the following fuzzy rules:

$R_1^n$: if strong consistency with $b_1$ and strong consistency with $b_2$, the measurement $a_n$ is consistent with the set of secondary measurements;

$R_2^n$: if strong consistency with $b_1$, the measurement $a_n$ is consistent with the set of secondary measurements;

$R_3^n$: if strong consistency with $b_2$, the measurement $a_n$ is consistent with the set of secondary measurements.

The score of consistency of the measurement $a_n$ with the set of secondary measurements is then determined by:

$$\alpha_n=(a_n b_1 \text{ AND } a_n b_2) \text{ OR } (a_n b_1) \text{ OR } (a_n b_2) \qquad (12)$$

where AND and OR are respectively fuzzy AND (intersection) and OR (union) operators and where $a_n b_1$, $a_n b_2$ are respectively the fuzzy values relating to the linguistic term "strong consistency" for the linguistic variables $L_{n1}$ and $L_{n2}$.

Other suites of fuzzy rules may be used alternatively or cumulatively. For a number P of secondary measurements, it will be possible for example to consider that if the measurement $a_n$ is consistent with at least a predetermined number $P_{min}<P$ of these measurements, then it is consistent with the set of secondary measurements. Generally, if $R_k^n$, $k=1, \ldots, K$, denotes the fuzzy consistency rules for the measurement $a_n$, the consistency score will be determined by:

$$\alpha_n = \underset{k=1, \ldots, K}{\mathrm{OR}}(R_k^n) \qquad (13)$$

where the rules $R_k^n$ involve the membership functions for the linguistic terms "strong consistency", "average consistency" and "weak consistency" of the linguistic variables $L_{np}$ and the AND, OR and NOT fuzzy operators.

The AND, OR and NOT fuzzy operators will preferably be the Lukasiewicz fuzzy operators defined by:

$$a \text{ AND } b=\max(0,a+b-1) \qquad (14\text{-}1)$$

$$a \text{ OR } b=\min(1,a+b) \qquad (14\text{-}2)$$

$$\mathrm{NOT}(a)=1-a \qquad (14\text{-}3)$$

Alternatively, it will be possible to use probabilistic operators or Zadeh operators.

The fuzzy rules occurring in expressions (12) and (13) can advantageously be weighted. For example in the case of expression (12), it is appreciated that a more significant weight is ascribed to the conjunctive term $a_n b_1$ AND $a_n b_2$ than to the terms $a_n b_1$, $a_n b_2$. The consistency score obtained by weighting the fuzzy rules can then be expressed as follows:

$$\alpha_n=((1-2\lambda)[a_n b_1 \text{ AND } a_n b_2]) \text{ OR } (\lambda[a_b b_1]) \text{ OR } (\lambda[a_n b_2]) \qquad (15)$$

where $0<\lambda<\tfrac{1}{2}$. In a similar manner, in expression (13) it will be possible to allot a higher weight to the rules $R_k^n$ conveying consistency with a significant number of secondary measurements and a not so high weight to those conveying consistency with a smaller number of such measurements. The weighting factor $\lambda$ may be adaptive. For example if the parameter to be estimated is the speed of the aircraft, the weighting factor $\lambda$ may be dependent on the Mach number. For example, for high Mach numbers it will be possible to tolerate more broadly consistency with one of the secondary measurements only and therefore envisage a larger weighting factor $\lambda$ than for smaller Mach numbers. Finally, weighting rules other than (15) may be envisaged without departing from the scope of the present disclosure.

Figure 8:
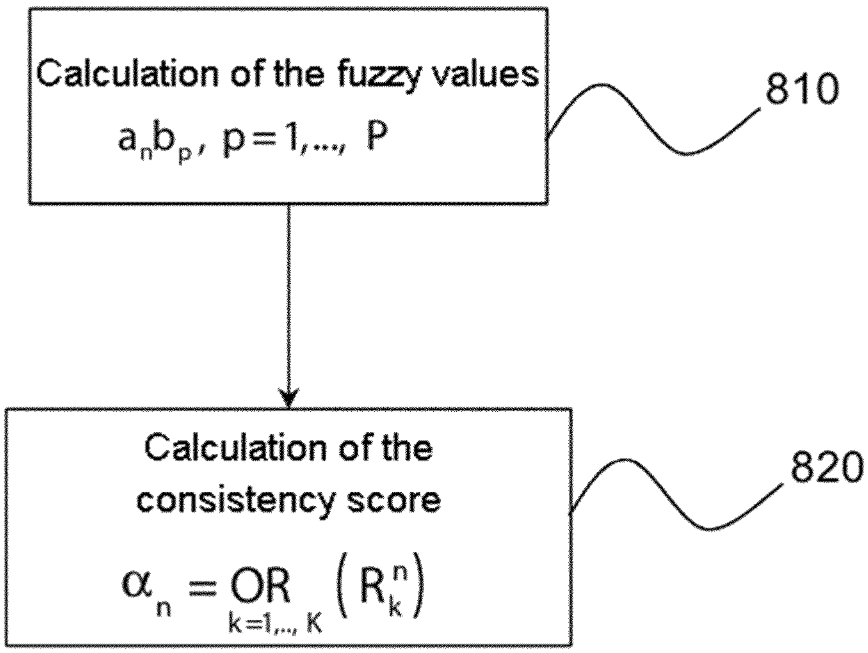
FIG. 8 represents a second variant for calculating a score of consistency of a main measurement with the set of secondary measurements.

FIG. 8 represents the second variant for calculating a score of consistency of a main measurement $a_n$ with the set of secondary measurements $b_p$, p=1, . . . , P according to the second variant.

In step 810, the fuzzy values relating to the linguistic term "strong consistency", $a_n b_p$, are calculated as a function of the discrepancies $d_{np}$ between the main measurement $a_n$ and the secondary measurements $b_p$, p=1, . . . , P. This calculation of fuzzy values (or fuzzification) is carried out on the basis of the membership functions such as that represented in FIG. 7 (with a membership function per secondary measurement). These can be obtained in a heuristic manner (fixing of the parameters $\sigma$ and $\gamma$) or else result from a learning phase. As indicated above, other more complex membership functions, in particular following nonlinear laws, may be used without departing from the scope of the present disclosure, as indicated above.

In step 820, predefined fuzzy consistency rules $R_k^n$, k=1, . . . , K are applied, operating on the fuzzy values obtained in the previous step.

In step 830, the consistency score $$\alpha_n = \underset{k=1,\dots,K}{OR}(R_k^n)$$

is calculated, where the OR operator is an OR fuzzy operator, preferably a Lukasiewicz OR operator. The various rules can furthermore be weighted as explained above.

If there is no prior fusion of the secondary measurements in steps 410, 420, then MP secondary measurements $b_m^p$, p=1, . . . , P, m=1, . . . , M are available. Linguistic variables $L_{nmp}$ are then defined as the consistency of the measurement $a_n$ with the secondary measurement $b_m^p$, m=1, . . . , M. The linguistic variable $L_{nmp}$ being expressable in the form of three linguistic terms {strong consistency; average consistency; weak consistency}, each of these terms being semantically defined as a fuzzy set over the values of discrepancy $d_{nmp}$ between the measurements $a_n$ and $b_m^p$. The calculation of the consistency score continues in a similar manner, on the basis of predefined fuzzy rules $R_k^n$, k=1, . . . , K, each rule involving the membership functions for the linguistic terms "strong consistency", "average consistency" and "weak consistency" of the linguistic variables $L_{nmp}$, and the AND, OR and NOT fuzzy operators. The consistency score can be obtained by the relation $$\alpha_n = \underset{k=1,\dots,K}{OR}(R_k^n)$$

or by a weighted relation, as explained above.

Figure 1:
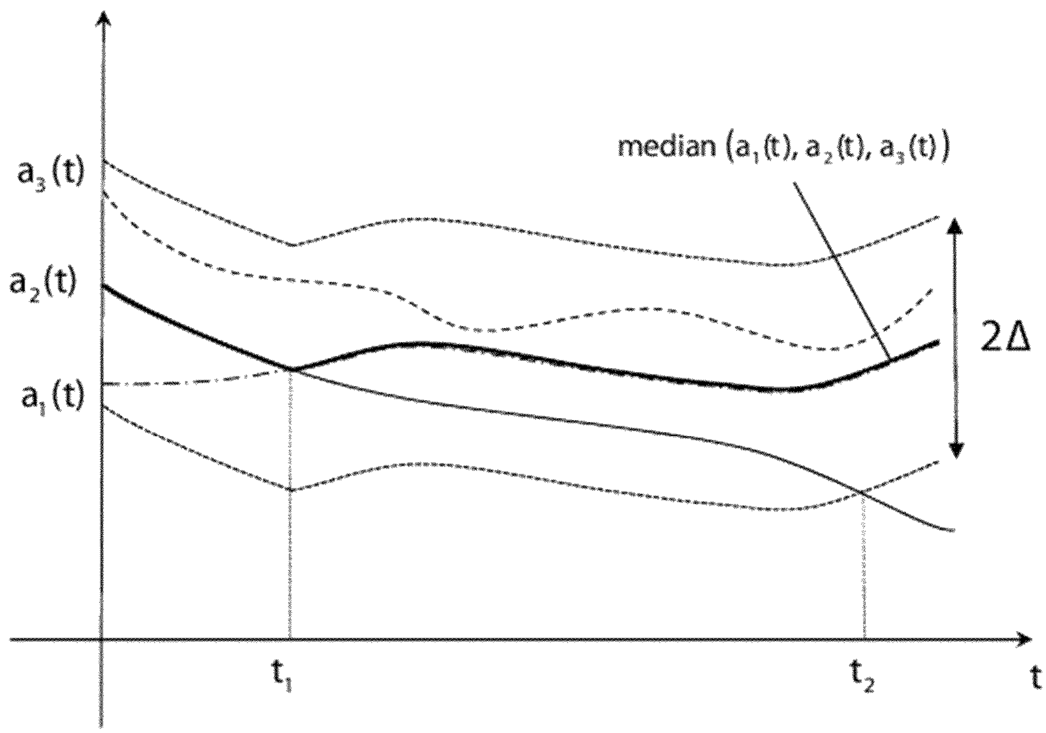
FIG. 1 represents an estimation of an aircraft flight parameter on the basis of measurements taken by sensors pertaining to one and the same technology, according to a data fusion method known from the prior art.
Figure 2A:
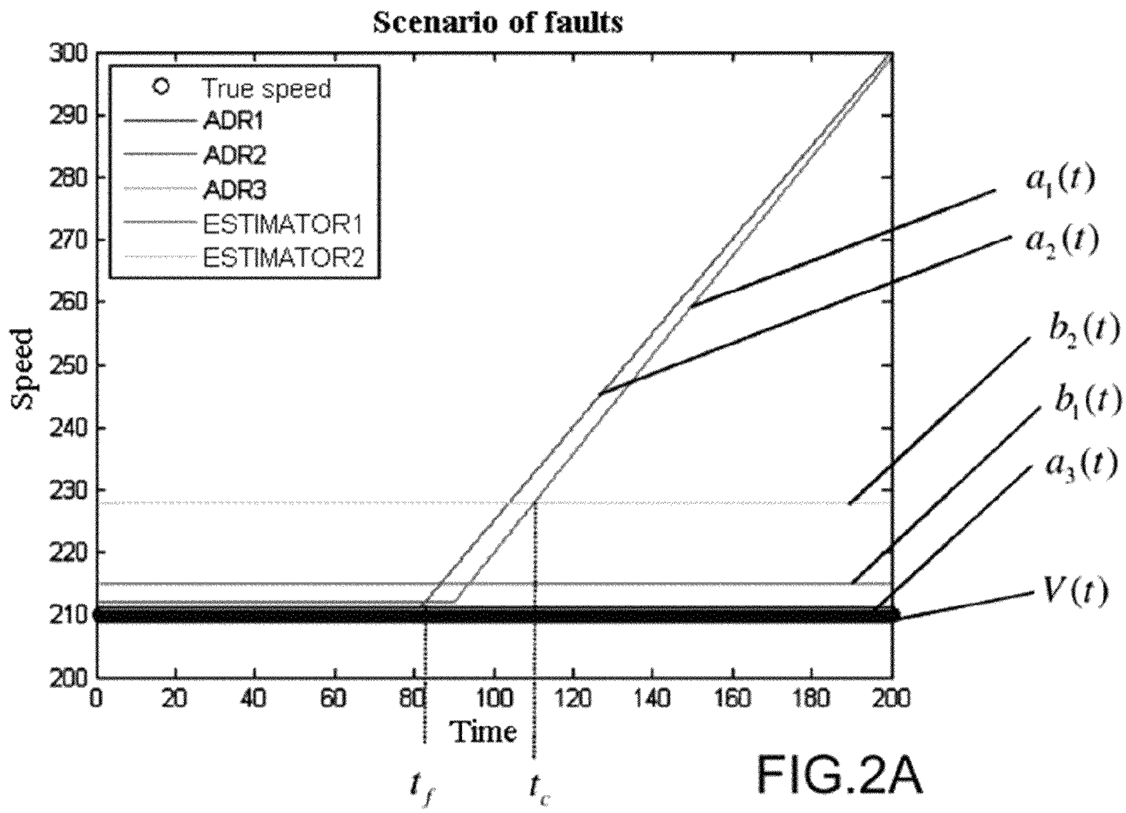
FIG. 2A represents measurements of an aircraft flight parameter by two sets of sensors pertaining to two dissimilar technologies.
Figure 2B:
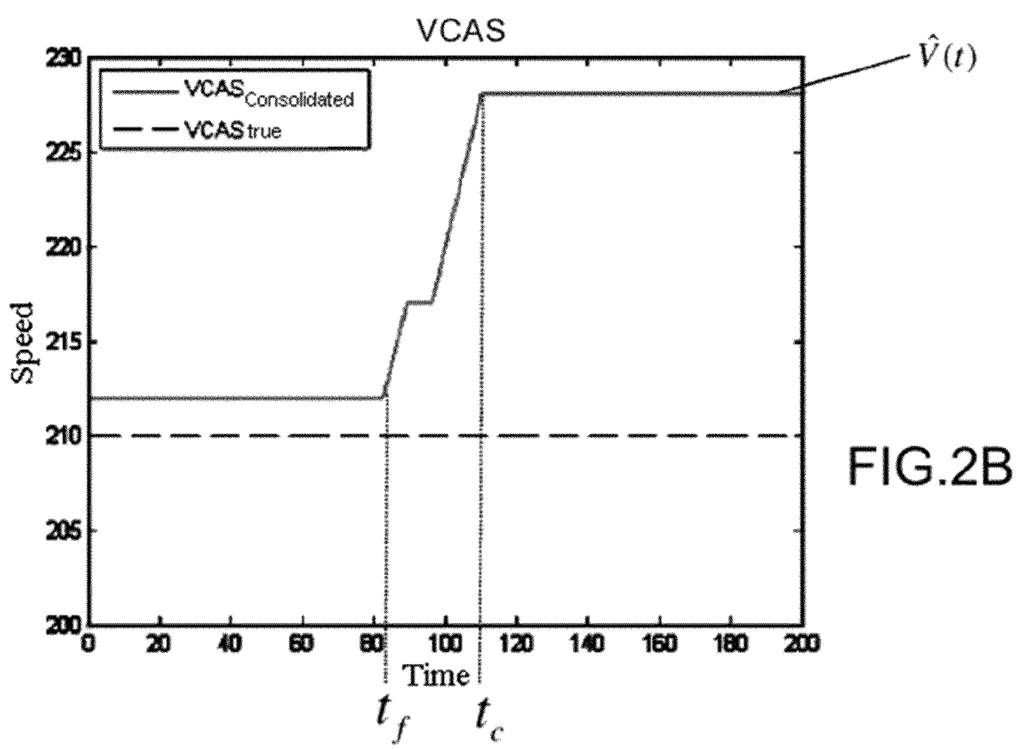
FIG. 2B represents an estimation of this flight parameter on the basis of the measurements FIG. 2A, according to a data fusion method known from the prior art.
Figure 9:
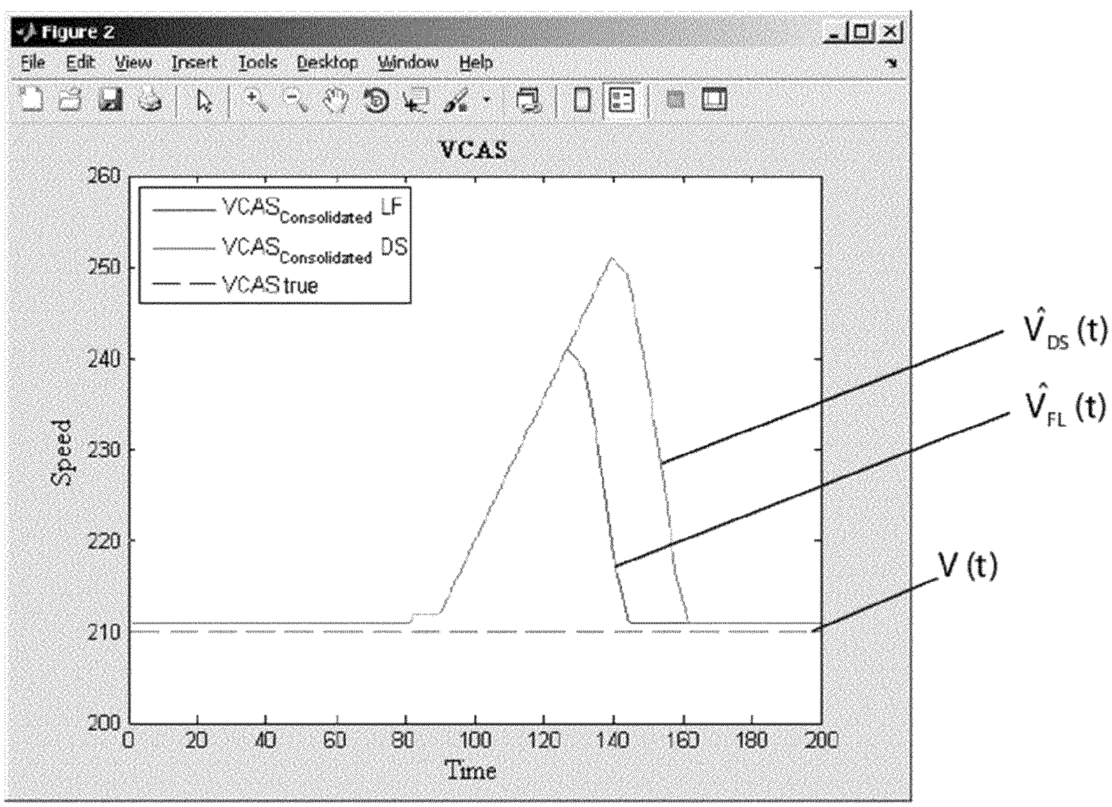
FIG. 9 represents an estimation of the flight parameter of an aircraft on the basis of the measurements of FIG. 2A, by a data fusion method according to the present disclosure.

FIG. 9 represents an estimation of the flight parameter of an aircraft (here the speed) on the basis of the measurements of FIG. 2A by a data fusion method according to the present disclosure.

In the present case, N=3 main sensors and two secondary sensors are available (P=2, M=1). The estimation of the flight parameter using a calculation of the consistency scores according to the first variant (Dempster-Shafer method) has been designated $\hat{V}_{DS}(t)$ and the estimation of this parameter using a calculation of the consistency scores according to the second variant (fuzzy logic) has been designated $\hat{V}_{FL}(t)$. It is noted that both the estimations $\hat{V}_{DS}(t)$ and $\hat{V}_{FL}(t)$ of the flight parameter V(t) are valid and accurate. Only a transient deviation of low amplitude appears. This amplitude can be controlled in particular by appropriately choosing the parameters of the mass functions in the first variant and the parameters of the membership functions in the second variant.

The data fusion method described in conjunction with FIG. 4 calls (steps 410,420) upon the calculation of the discrepancies between each main measurement and the set of secondary measurements and then upon a calculation of the consistency score as a function of these discrepancies.

Alternatively, it is however possible to use a supervised learning method to obtain a consistency score directly. In a learning phase, the algebraic discrepancies between a main measurement and the secondary measurements are recorded for a plurality of typical cases and the main measurement is classed as consistent or inconsistent. This classification can be carried out as a function of a parameter. These typical cases make it possible to determine a consistency region, an inconsistency region and an undecidable region in a given space. It will be possible in particular to use for the supervised learning a one-class support vector machine, a so-called "one class SVM" machine, such as described for example in the article by B. Schölkopf et al. entitled "Estimating the support of a high dimensional distribution" published in the journal Neural Computation, vol. 13, pp. 1443-1471, 2001.

After this learning phase, it is possible to undertake an automatic classification of a new main measurement according to the part of space in which it is situated. The "one class SVM" method provides a positive or negative score depending on whether the main measurement is consistent or inconsistent. This score can thereafter transform into a consistency score $\alpha_n$ lying between 0 and 1.

Figure 10:
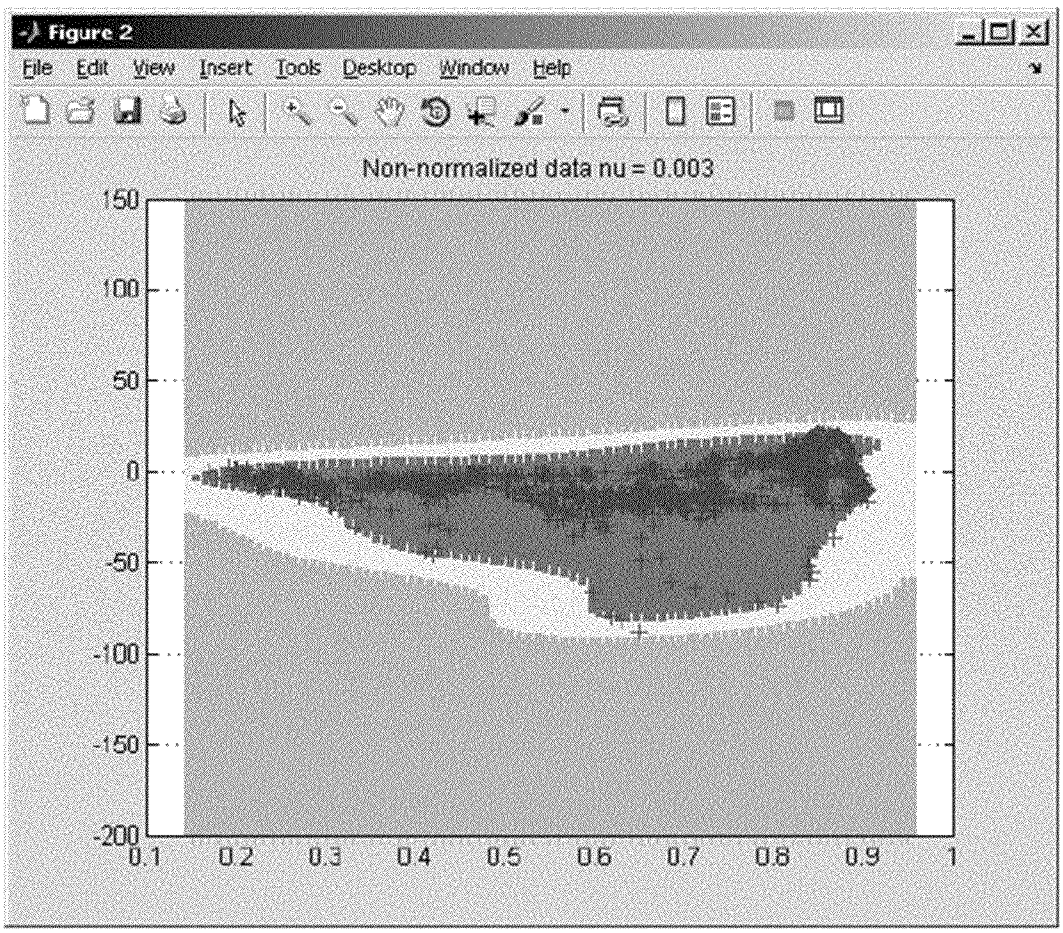
FIG. 10 represents an example of classification of consistency of a main measurement by supervised learning.

FIG. 10 represents an exemplary classification of consistency of a main measurement by supervised learning. The Mach number has been represented as abscissa and the algebraic discrepancy between the main measurement and a secondary measurement as ordinate.

The crosses correspond to the learning cases of the SVM method. These learning cases make it possible to distinguish three distinct regions in the classification chart: a region 1010 corresponding to the consistency region, a region 1030 corresponding to the inconsistency region and a transition region 1020. To determine the consistency or the inconsistency of a main measurement, it then suffices to see in which region of the chart the measurement is situated. The consistency scores are then given on the one hand by the Mach number and on the other hand by the algebraic discrepancy between the main measurement and the secondary measurement.

According to a variant, the consistency scores are not given directly by the Mach number and the discrepancy between the main measurement and a secondary measurement but the parameters of the membership functions (for example the transition threshold $\sigma$ and the slope $\gamma$ in the case of the law illustrated in FIG. 7) are adaptive. The parameters can depend on the Mach number in an analytical manner (heuristic dependency law) or else the values of these parameters can be stored in a look-up table, addressed by the Mach number.

In a more general manner, supervised consistency classification or adaptive parameterization of the membership functions can be carried out for various flight phases or various flight conditions, in conjunction or otherwise with the Mach number. For example, it will be possible to have more critical consistency conditions for certain main measurements during the landing and/or takeoff phases.

While at least one exemplary embodiment of the present disclosure has been shown and described, it should be understood that modifications, substitutions and alternatives may be apparent to one of ordinary skill in the art and can be made without departing from the scope of the disclosure described herein. This application is intended to cover any adaptations or variations of the specific embodiments discussed herein. In addition, in this application, the terms "comprise" or "comprising" do not exclude other elements or steps, and the terms "a" or "one" do not exclude a plural number. Furthermore, characteristics or steps which have been described with reference to one of the above exemplary embodiments may also be used in combination with other characteristics or steps of other exemplary embodiments described above.

The invention claimed is:

1. A method for fusing measurements of an aircraft flight parameter based on a first set of main measurements taken by a first set of main sensors and a plurality of second sets of secondary measurements taken by second sets of secondary sensors, the first set of main measurements exhibiting a greater degree of accuracy than the plurality of second sets of secondary measurements, the method comprising:

at a processor configured to receive the first set of main measurements taken by the first set of main sensors and the plurality of second sets of secondary measurements taken by the second sets of secondary sensors:

calculating a discrepancy between each of the main measurements and the secondary measurements;

determining, by the discrepancy, a score of consistency of each of the main measurements with the secondary measurements;

performing, for each possible fault configuration of the main sensors, a first, conditional estimation of the aircraft flight parameter based on the main measurements taken by the main sensors which are not faulty;

determining, for each fault configuration, a weighting coefficient based on the score of consistency of the main measurements;

performing a second estimation of the aircraft flight parameter by weighting the first, conditional estimations relating to the fault configurations by the weighting coefficients corresponding to these fault configurations; and outputting the second estimation of the aircraft flight parameter to one or more systems of the aircraft.

2. The method for fusing measurements according to claim 1, further comprising calculating, for each set of the plurality of second sets of secondary measurements, the discrepancy between the main measurement and each secondary measurement of the set.

3. The method for fusing measurements according to claim 1, wherein the score of consistency of each of the main measurements with the secondary measurements is determined by:

calculating, based on the discrepancy between the main measurement and each secondary measurement, masses respectively allocated to a first focal set corresponding to a first hypothesis of consistency of the main measurement with the secondary measurement, to a second focal set corresponding to a second hypothesis of absence of consistency of the main measurement with the secondary measurement and to a third hypothesis corresponding to an uncertainty of the consistency of the main measurement with the secondary measurement;

estimating a belief that the main measurement is consistent with at least one of the secondary measurements based on;

estimating a plausibility that the main measurement is consistent with at least one of the secondary measurements based on the masses; and calculating the score of consistency by combining the belief and the plausibility by a combination function.

4. The method for fusing measurements according to claim 1, further comprising calculating, for each set of secondary measurements, the discrepancy between each of the main measurements and a fused secondary measurement obtained by fusing the secondary measurements of the set.

5. The method for fusing measurements according to claim 4, wherein the score of consistency of each of the main measurements with the secondary measurements is determined by:

calculating, based on the discrepancy between the main measurement and each fused secondary measurement, masses respectively allocated to a first focal set corresponding to a first hypothesis of consistency of the main measurement with the fused secondary measurement, to a second focal set corresponding to a second hypothesis of absence of consistency of the main measurement with the fused secondary measurement and to a third hypothesis corresponding to an uncertainty of the consistency of the main measurement with the fused secondary measurement;

estimating a belief that the main measurement is consistent with at least one of the fused secondary measurements based on the masses;

estimating a plausibility that the main measurement is consistent with at least one of the fused secondary measurements based on the masses; and calculating the consistency score by combining the belief and the plausibility by a combination function.

6. The method for fusing measurements according to claim 3, wherein the combination function is an average.

7. The method for fusing measurements according to claim 2, wherein the score of consistency of each of the main measurements with the secondary measurements is determined by:

calculating fuzzy values of strong consistency, average consistency, weak consistency between the main measurement and each secondary measurement based on the discrepancy between the main measurement and the secondary measurement;

calculating fuzzy consistency rules operating on the fuzzy values; and calculating the consistency score by combining the calculated fuzzy rules.

8. The method for fusing measurements according to claim 4, wherein the score of consistency of each of the main measurements with the secondary measurements is determined by:

calculating fuzzy values of strong consistency, average consistency, weak consistency between each of the main measurements and each fused secondary measurement based on the discrepancy between the main measurement and the fused secondary measurement;

calculating fuzzy consistency rules operating on the fuzzy values; and calculating the score of consistency by combining the calculated fuzzy rules with a combination operator.

9. The method for fusing measurements according to claim 7, wherein the fuzzy consistency rules use Lukasiewicz OR, AND, and NOT fuzzy operators.

10. The method for fusing measurements according to claim 9, wherein a combination operator is an OR function.

11. The method for fusing measurements according to claim 10, wherein the fuzzy rules are weighted with weighting factors before combining, a weighting factor of a rule being higher the more the rule involves a fuzzy value of strong consistency with a larger number of elementary measurements.

12. The method for fusing measurements according to claim 2, wherein the score of consistency of each of the main measurements with the secondary measurements is obtained by a supervised learning method of "one class SVM" type.

13. The method for fusing measurements according to claim 4, wherein the score of consistency of each of the main measurements with the fused secondary measurements is obtained by a supervised learning method of "one class SVM" type.

14. The method for fusing measurements according to claim 13, wherein the first, conditional estimation, relating to the fault configuration of the main sensors, is obtained as a median of the main measurements of the main sensors which are not faulty, when a number of the main sensors which are not faulty is odd.

15. The method for fusing measurements according to claim 1, wherein the first, conditional estimation, relating to the fault configuration of the main sensors, is obtained as an average of the main measurements of the main sensors which are not faulty.

16. A method for fusing measurements of an aircraft flight parameter based on a first set of main measurements taken by a first set of main sensors and a plurality of second sets of secondary measurements taken by second sets of secondary sensors, the first set of main measurements exhibiting a greater degree of accuracy than the plurality of second sets of secondary measurements, the method comprising:

at a processor configured to receive the first set of main measurements taken by the first set of main sensors and the plurality of second sets of secondary measurements taken by the second sets of secondary sensors:

calculating a discrepancy between each of the main measurements and the secondary measurements;

determining, by the discrepancy, a score of consistency of each of the main measurements with fused secondary measurements obtained by fusing the secondary measurements of the plurality of second sets of secondary measurements;

performing, for each possible fault configuration of the main sensors, a first, conditional estimation of the aircraft flight parameter based on the main measurements taken by the main sensors which are not faulty;

determining, for each fault configuration, a weighting coefficient based on the score of consistency of the main measurements;

performing a second estimation of the aircraft flight parameter by weighting the first, conditional estimations relating to the fault configurations by the weighting coefficients corresponding to these fault configurations; and outputting the second estimation of the aircraft flight parameter to one or more systems of the aircraft;

wherein determining the score of consistency of each of the main measurements with the secondary measurements comprises:

calculating, based on the discrepancy between the main measurement and each secondary measurement, masses respectively allocated to a first focal set corresponding to a first hypothesis of consistency of the main measurement with the secondary measurement, to a second focal set corresponding to a second hypothesis of absence of consistency of the main measurement with the secondary measurement and to a third hypothesis corresponding to an uncertainty of the consistency of the main measurement with the secondary measurement, estimating a belief that the main measurement is consistent with at least one of the secondary measurements based on the masses, estimating a plausibility that the main measurement is consistent with at least one of the secondary measurements based on the masses, and calculating the score of consistency by combining the belief and the plausibility by a combination function.

17. A method for fusing measurements of an aircraft flight parameter based on a first set of main measurements taken by a first set of main sensors and a plurality of second sets of secondary measurements taken by second sets of secondary sensors, the first set of main measurements exhibiting a greater degree of accuracy than the plurality of second sets of secondary measurements, the method comprising:

at a processor configured to receive the first set of main measurements taken by the first set of main sensors and the plurality of second sets of secondary measurements taken by the second sets of secondary sensors:

calculating a discrepancy between each of the main measurements and the secondary measurements;

determining, by the discrepancy, a score of consistency of each of the main measurements with the secondary measurements;

performing, for each possible fault configuration of the main sensors, a first, conditional estimation of the aircraft flight parameter based on the main measurements taken by the main sensors which are not faulty;

determining, for each fault configuration, a weighting coefficient based on the score of consistency of the main measurements;

performing a second estimation of the aircraft flight parameter by weighting the first, conditional estimations relating to the fault configurations by the weighting coefficients corresponding to these fault configurations; and outputting the second estimation of the aircraft flight parameter to one or more systems of the aircraft;

wherein determining the score of consistency of each of the main measurements with the secondary measurements comprises:

calculating, based on the discrepancy between the main measurement and each fused secondary measurement, masses respectively allocated to a first focal set corresponding to a first hypothesis of consistency of the main measurement with the fused secondary measurement, to a second focal set corresponding to a second hypothesis of absence of consistency of the main measurement with the fused secondary measurement and to a third hypothesis corresponding to an uncertainty of the consistency of the main measurement with the fused secondary measurement, estimating a belief that the main measurement is consistent with at least one of the fused secondary measurements based on the masses, estimating a plausibility that the main measurement is consistent with at least one of the fused secondary measurements based on the masses, and calculating the consistency score by combining the belief and the plausibility by a combination function.

* * * * *